US011234004B2

(12) United States Patent
Saeedi et al.

(10) Patent No.: US 11,234,004 B2
(45) Date of Patent: Jan. 25, 2022

(54) BLOCK TYPE PREDICTION LEVERAGING BLOCK-BASED PIXEL ACTIVITIES

(71) Applicant: ATI Technologies ULC, Markham (CA)

(72) Inventors: Mehdi Saeedi, Thornhill (CA); Boris Ivanovic, Richmond Hill (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 16/207,893

(22) Filed: Dec. 3, 2018

(65) Prior Publication Data

US 2020/0177888 A1 Jun. 4, 2020

(51) Int. Cl.
*H04N 19/176* (2014.01)
*H04N 19/159* (2014.01)
*H04N 19/196* (2014.01)
*H04N 19/124* (2014.01)
*H04N 19/149* (2014.01)

(52) U.S. Cl.
CPC ......... *H04N 19/176* (2014.11); *H04N 19/124* (2014.11); *H04N 19/159* (2014.11); *H04N 19/197* (2014.11); *H04N 19/149* (2014.11)

(58) Field of Classification Search
CPC ........................... H04N 19/176; H04N 19/159
See application file for complete search history.

(56) References Cited

U.S. PATENT DOCUMENTS

| | | | | |
|---|---|---|---|---|
| 6,731,685 B1* | 5/2004 | Liu | ................. | H04J 3/1688 348/385.1 |
| 6,765,962 B1* | 7/2004 | Lee | ................. | H04N 19/197 375/240.03 |
| 2005/0047504 A1* | 3/2005 | Sung | ................. | H04N 19/105 375/240.2 |
| 2012/0287987 A1* | 11/2012 | Budagavi | ............ | H04N 19/587 375/240.02 |

(Continued)

OTHER PUBLICATIONS

"Co-occurrence matrix", Wikipedia.org, Sep. 7, 2016, 2 pages, https://en.wikipedia.org/wiki/Co-occurrence_matrix. [Retrieved Jul. 31, 2018].

(Continued)

*Primary Examiner* — Jerry T Jean Baptiste
(74) *Attorney, Agent, or Firm* — Kowert Hood Munyon Rankin and Goetzel PC; Rory D. Rankin (57) ABSTRACT

Systems, apparatuses, and methods for block type prediction leveraging block-based pixel activities are disclosed. A pre-encoder generates predictions of block types for the blocks of a video frame based on associated pixel activities. For each block, the pre-encoder calculates the difference between the pixel activities of the block of a current frame and the pixel activities of a corresponding block of a previous video frame. If the difference is less than a first threshold, the pre-encoder predicts that the block will be a skip block. If the difference is in between the first threshold and a second threshold, the pre-encoder predicts that the block will be a P-block. Otherwise, if the difference is greater than the second threshold, then the pre-encoder (Continued)

predicts that the block will be an I-block. The pre-encoder uses the predictions to select quantization parameter (QP) ranges for encoding the blocks of the video frame.

21 Claims, 10 Drawing Sheets

(56) References Cited

U.S. PATENT DOCUMENTS

| | | |
|---|---|---|
| 2013/0094571 A1* | 4/2013 | Zhang .................. H04N 19/152 |
| | | 375/240.03 |
| 2014/0269919 A1 | 9/2014 | Rodriguez |
| 2014/0376624 A1 | 12/2014 | Li et al. |
| 2015/0055706 A1 | 2/2015 | Xu et al. |
| 2015/0256850 A1 | 9/2015 | Kottke et al. |
| 2017/0339390 A1* | 11/2017 | Doshi ....................... G06T 7/90 |
| 2018/0109804 A1 | 4/2018 | Saeedi |
| 2019/0045210 A1 | 2/2019 | Guermazi et al. |

OTHER PUBLICATIONS

International Search Report and Written Opinion in International Application No. PCT/IB2019/057945, dated Dec. 9, 2019, 8 pages.

Usha, M., "Motion Detection in Compressed Video Using Macroblock Classification", Advanced Computing: An International Journal, May 2014, 15 pages, vol. 5, No. 2/3.

Zhao et al., "Macroblock Classification for Video Encoder Complexity Management", Signal Processing Image Communication, Oct. 2003, 5 pages.

* cited by examiner

| Predicted Block Type 705 | Predicted Number of Bits per Block 710 |
|---|---|
| Skip-Block | 16 |
| P-Block | 256 |
| I-Block | 2048 |

BLOCK TYPE PREDICTION LEVERAGING BLOCK-BASED PIXEL ACTIVITIES

BACKGROUND

Description of the Related Art

Various applications perform encoding and decoding of images or video content. For example, video transcoding, desktop sharing, cloud gaming, and gaming spectatorship are some of the applications which include support for encoding and decoding of content. Pixel activity calculations inside a block are commonly performed in different video processing and analysis algorithms. For example, block-based pixel activity can be used to determine texture types in an image for some applications. Examples of blocks include a coding tree block (CTB) for use with the high efficiency video coding (HEVC) standard or a macroblock for use with the H.264 standard. Other types of blocks for use with other types of standards are also possible.

Different methods can be used to calculate pixel activities for the blocks of an image or video frame. For example, in one implementation, a gray-level co-occurrence matrix (GLCM) is calculated for each block of the frame. GLCM data shows how often different variations of pixel brightness occur in a block. GLCM data can be calculated for pixels with distance d and angle theta. In another implementation, a two-dimensional (2D) spatial gradient is calculated for a given block. This gradient can capture vertical and horizontal edges. In a further implementation, a wavelet transform, or another type of transform, is used to measure an activity parameter for a given block. Accordingly, as used herein, the terms "pixel activity metric", "pixel activity", or "pixel activities" are defined as a GLCM, a gradient, a wavelet transform, or other metric or summary statistic for the block. For example, a pixel activity can be a spatial gradient of the difference of two blocks (current and reference) or any other kind of comparative based calculation between the two blocks. A "pixel activity" can also be defined as a metric describing a temporal relationship between the block under study and a previous block (e.g., accumulated absolute or square differences). It is noted that the terms "pixel activity" and "block-based pixel activity" can be used interchangeably herein. In some cases, the pixel activity is represented using a matrix. In other cases, the pixel activity is represented in other manners.

For the different video compression algorithms, blocks can be broadly generalized as falling into one of three different types: I-blocks, P-blocks, and skip blocks. It should be understood that while these three types of blocks will be described throughout this disclosure, this does not preclude the use of other types of blocks. It is also noted that "blocks" can also be referred to herein as "macroblocks". As used herein, an intra-block (or "I-block") is or "Intra-block" is a block that depends on blocks from the same frame. A predicted-block ("P-block") is defined as a block within a predicted frame ("P-frame"), where the P-frame is defined as a frame which is based on previously decoded pictures. A "skip block" is defined as a block which is relatively (based on a threshold) unchanged from a corresponding block in a reference frame. Accordingly, a skip block generally requires a very small number of bits to encode.

An encoder typically has a target bitrate which the encoder is trying to achieve when encoding a given video stream. The target bitrate roughly translates to a target bitsize for each frame of the encoded version of the given video stream. For example, in one implementation, the target bitrate is specified in bits per second (e.g., 3 megabits per second (Mbps)) and a frame rate of the video sequence is specified in frames per second (fps) (e.g., 60 fps, 24 fps). In this example implementation, the preferred bit rate is divided by the frame rate to calculate a preferred bitsize of the encoded video frame.

When the encoder receives a particular frame, and extensive analysis or encoding has not yet been performed, the encoder does not know the complexity and layout of the scene depicted within the frame. This can cause the encoder to stray from the desired target bit size if no control mechanism is used. For example, a particular scene might include a sky on the upper half of the screen which is not changing while the bottom half includes more detail and/or activity. In such cases, if the encoder starts out by encoding the top portion of the screen, the encoder may use up too many bits for the "sky portion" of the image while not saving enough bits for the more complex bottom portion of the screen. Alternatively, the reverse may be true for some frames where the upper portion of the screen has more complexity while the bottom part of the screen has less complexity. For this type of frame, the encoder might save too many bits for the bottom portion of the screen while not using enough bits to capture the complexity in the top portion of the screen if the absence of a suitable control mechanism. Accordingly, techniques for helping the encoder preserve the perceptual quality of a frame while meeting a target bitrate for the encoded bitstream are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing block type prediction leveraging block-based pixel activities are disclosed herein. In one implementation, a system includes a pre-encoder and an encoder for encoding a video stream. In one implementation, the pre-encoder generates predictions of block types for the blocks of a video frame based on the pixel activities associated with the blocks. In one implementation, the pixel activities are a gradient calculated for each block of the frame. In another implementation, the pixel activities include a texture analysis of each block of the frame. In other implementations, the pixel activities include any of various summary statistics or other mathematical quantities (e.g., average, maximum value, variance), which can take into consideration individual pixel sample values, their locations, and their relationships to one another. In one implementation, the pixel activities are based on an average pixel value without depending on location while in another implementation, the pixel activities depend on the location of the samples (e.g., based on the average difference with a bottom right neighbor). Other variations for calculating pixel activities are possible and are contemplated.

In one implementation, the pre-encoder processes a new frame on a block-by-block basis. For each block of a video frame, the pre-encoder calculates a metric using the current block and the corresponding block of a previous video frame. In one embodiment, the metric is the difference in pixel activities between the blocks. In another embodiment, the metric is the square (or absolute) value of each of the collocated pixels in the blocks. Other embodiments could leverage multiple metrics, or use a first metric to potentially shortcut calculation of a second metric. In one implementation, when a single metric is used, if the metric is less than a first threshold, the pre-encoder predicts the likely block type the encoder will use to encode the block (e.g., that the block will likely be encoded by the encoder as a skip block). It is noted that the pre-encoder could be wrong in its prediction and the block could ultimately end up being coded differently than predicted. It is noted that in some cases, depending on the type of metric, this check could actually be determining if the metric is greater than a first threshold. If the metric falls between the first threshold and a second threshold, the pre-encoder predicts that the block will likely be encoded by the encoder as a P-block. Otherwise, if the difference is greater than the second threshold, the pre-encoder predicts that the block will likely be encoded by the encoder as an I-block. As used herein, the expression "meeting a threshold" or "meet a threshold" refers to being greater than a threshold or less than a threshold.

In one implementation, the pre-encoder uses the predicted block type in addition to other information (e.g., such as desired local quality) to suggest an appropriate or budget-aware quantization strength to the encoder. The expected impact of the encoded size of each block to the budget is related to desired quality, likely block type, the content itself, and/or other information. The pre-encoder conveys an indication of the suggested budget-aware quantization strength to the encoder. The encoder selects a quantization strength (e.g., quantization parameter ("QP")) to use when encoding the block based on the suggested quantization strength generated by the pre-encoder.

Figure 1:
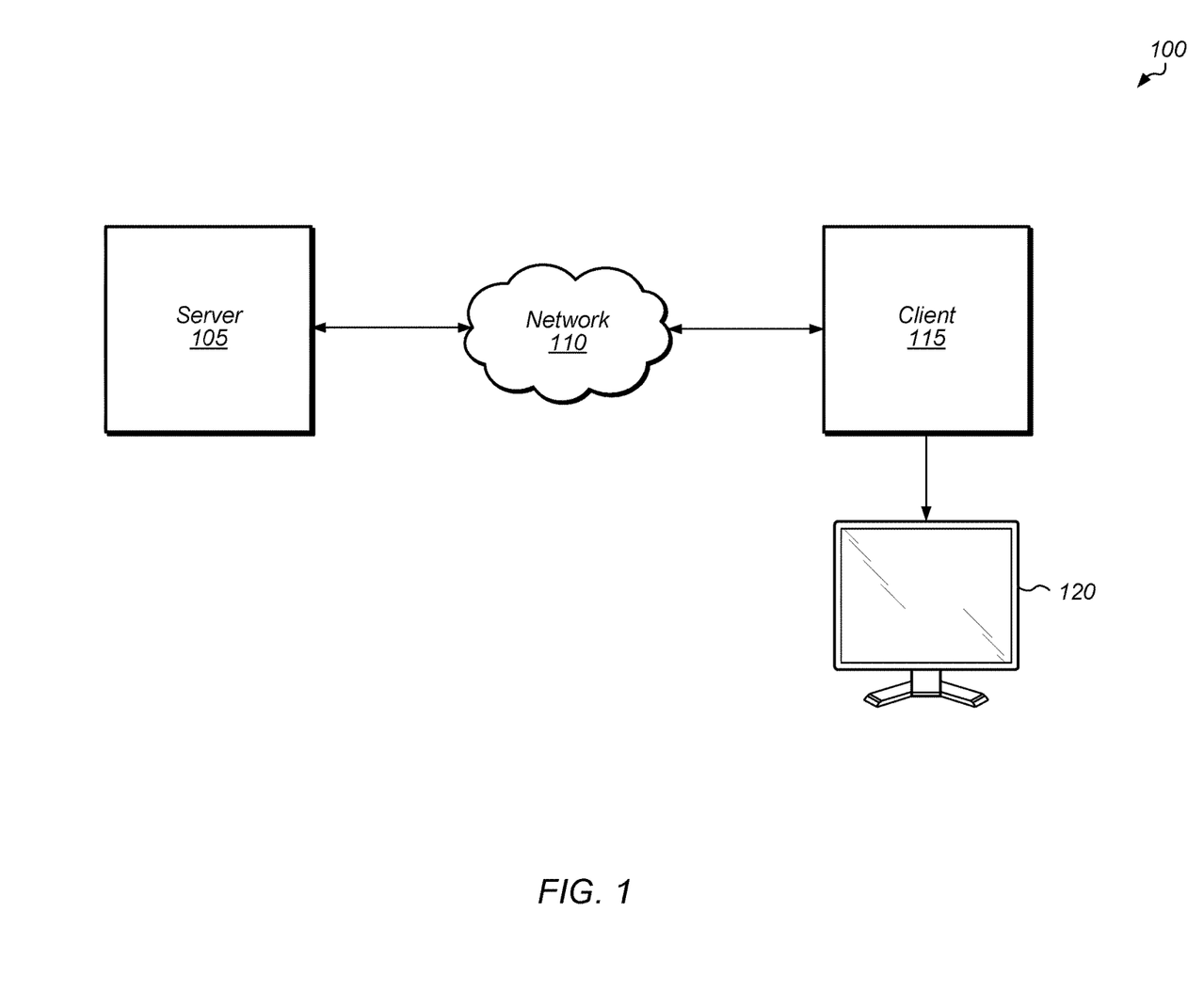
FIG. 1 is a block diagram of one implementation of a system for encoding and decoding content.

Referring now to FIG. 1, a block diagram of one implementation of a system 100 for encoding and decoding content is shown. System 100 includes server 105, network 110, client 115, and display 120. In other implementations, system 100 includes multiple clients connected to server 105 via network 110, with the multiple clients receiving the same bitstream or different bitstreams generated by server 105. System 100 can also include more than one server 105 for generating multiple bitstreams for multiple clients.

In one implementation, system 100 encodes and decodes video content. In various implementations, different applications such as a video game application, a cloud gaming application, a virtual desktop infrastructure application, or a screen sharing application are executed by system 100. In other implementations, system 100 executes other types of applications. In one implementation, server 105 renders video or image frames and then encodes the frames into an encoded bitstream. In one implementation, server 105 includes a pre-encoder and an encoder to manage the encoding process. The pre-encoder can also be referred to herein as a "pre-analysis unit". The pre-encoder predicts likely block types that will be used by the encoder for encoding blocks of each frame. For each block, the predicted block-type is used to determine a suggested quantization parameter (QP) range for encoding the block. The encoder then uses a QP within the corresponding QP range when encoding each block. This allows the encoder to encode the frames into a bitstream that meets a target bitrate. After the encoded bitstream is generated, server 105 conveys the encoded bitstream to client 115 via network 110. Client 115 decodes the encoded bitstream and generates video or image frames to drive to display 120 or to a display compositor.

Network 110 is representative of any type of network or combination of networks, including wireless connection, direct local area network (LAN), metropolitan area network (MAN), wide area network (WAN), an Intranet, the Internet, a cable network, a packet-switched network, a fiber-optic network, a router, storage area network, or other type of network. Examples of LANs include Ethernet networks, Fiber Distributed Data Interface (FDDI) networks, and token ring networks. In various implementations, network 110 includes remote direct memory access (RDMA) hardware and/or software, transmission control protocol/internet protocol (TCP/IP) hardware and/or software, router, repeaters, switches, grids, and/or other components.

Server 105 includes any combination of software and/or hardware for rendering video/image frames and encoding the frames into a bitstream. In one implementation, server 105 includes one or more software applications executing on one or more processors of one or more servers. Server 105 also includes network communication capabilities, one or more input/output devices, and/or other components. The processor(s) of server 105 include any number and type (e.g., graphics processing units (GPUs), central processing units (CPUs), digital signal processors (DSPs), field programmable gate arrays (FPGAs), application specific integrated circuits (ASICs)) of processors. The processor(s) are coupled to one or more memory devices storing program instructions executable by the processor(s). Similarly, client 115 includes any combination of software and/or hardware for decoding a bitstream and driving frames to display 120. In one implementation, client 115 includes one or more software applications executing on one or more processors of one or more computing devices. In various implementations, client 115 is a computing device, game console, mobile device, streaming media player, or other type of device.

Figure 2:
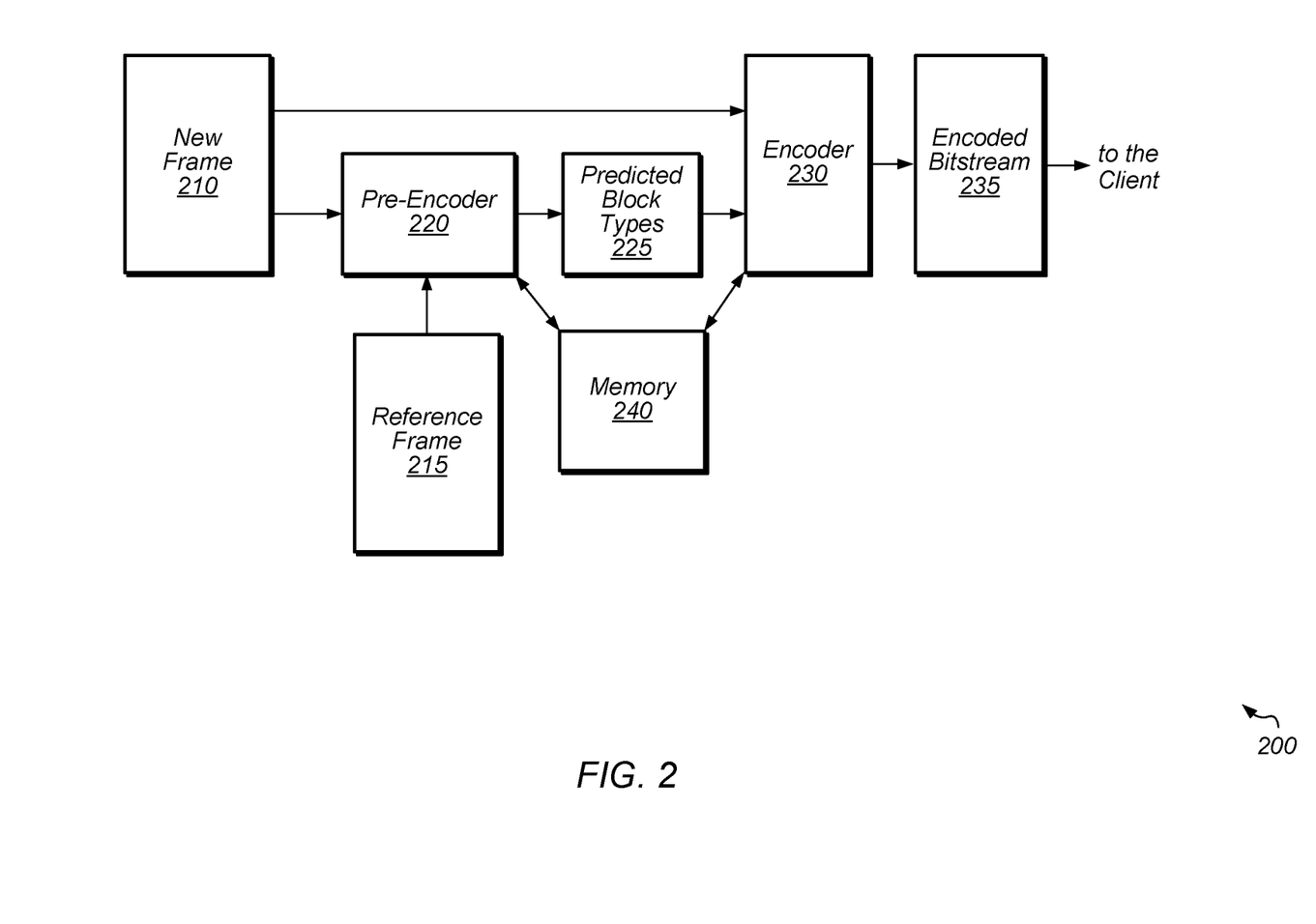
FIG. 2 is a block diagram of one implementation of a server.

Turning now to FIG. 2, a block diagram of one implementation of the components of a server 200 for encoding frames of a video is shown. It is noted that in other implementations, server 200 includes other components and/or is arranged in other suitable manners than is shown in FIG. 2. A new frame 210 of a video is received by server 200 and provided to pre-encoder 220 and encoder 230. Each of pre-encoder 220 and encoder 230 is implemented using any suitable combination of hardware and/or software. In various implementations, the software instructions for implementing pre-encoder 220 and/or encoder 230 are stored in memory 240. Memory 240 is representative of any number and type of memory devices. In one implementation, pre-encoder 220 generates predicted block types 225 for the blocks of new frame 210 based on a comparison of the pixel activities of new frame 210 and the pixel activities of reference frame 215. As used herein, the term "reference frame" is defined as a frame of a video stream that is used to define and/or encode one or more other frames of the video stream.

In one implementation, pre-encoder 220 processes new frame 210 on a block-by-block basis. For each block, pre-encoder 220 calculates pixel activities or receives already calculated pixel activities. Pre-encoder 220 compares the pixel activities for the block to the pixel activities for a corresponding block in reference frame 215. In one implementation, the corresponding block in reference frame 215 is identified by motion estimation data (i.e., a motion vector). In various implementations, a motion estimation unit (not shown) generates the motion estimation data to identify which blocks in reference frame 215 correspond to the blocks in new frame 210. In one implementation, the pixel activities for the block in new frame 210 are compared to the pixel activities for the corresponding block in reference frame 215. The difference between the pixel activities for the block in new frame 210 and the corresponding block in reference frame 215 is compared to one or more thresholds. In some implementations, a difference between pixel activities of two blocks is based on a direct comparison of one block to another and a determination of which pixels differ. Such a difference is then compared to a threshold to determine if it is greater or less than the threshold. In other implementations, the difference includes performing a mathematical operation on one or both of the blocks. For example, a pixel activity metric of a first block may be divided by the pixel activity metric of a second block. The resulting ratio may then be compared to a threshold. Still further, in some implementations a measure of order (or disorder) of a given block is compared to that of another block with the difference being compared to a threshold. These and other embodiments are possible and are contemplated, and as used herein, the term "difference" is intended to encompass such embodiments. In a first implementation, if the difference doesn't meet (e.g., is less than) a first threshold, then pre-encoder 220 predicts that the block will likely be encoded as a skip block. In a second implementation, for a different pixel activity metric, if the difference is greater than the first threshold, then pre-encoder 220 predicts that the block will likely be encoded as a skip block. For the first implementation, if the difference between the pixel activities for the block in new frame 210 and the pixel activities for the block in reference frame 215 is in between the first threshold and a second threshold, then pre-encoder 220 predicts that the block will likely be encoded as a P-block. Otherwise, if the difference between the pixel activities for the block in new frame 210 and the pixel activities for the block in reference frame 215 is greater than the second threshold, then pre-encoder 220 predicts that the block will likely be encoded as an I-block. It is noted that for the second implementation, for a different pixel activity metric, the comparison between the difference and the thresholds can be reversed when generating the prediction.

In other implementations, multiple pixel activity metrics are used for making predictions about how blocks will likely be encoded into the various block types. For example, in another implementation, an accumulated co-located block difference metric is calculated where the difference of co-located pixels between the reference block in reference frame 215 and the new block in new frame 210 is accumulated after applying a math operation (e.g., absolute value, square, transfer function application). In one implementation, an aggregated metric is determined by weighing the pixel activity difference against the second metric, using fixed or adaptive weights. In one implementation, if the aggregated metric is less than a first threshold, then pre-encoder 220 predicts that the block will likely be encoded as a skip block. In another implementation, the comparison with the first threshold is reversed such that if the aggregated metric is greater than the first threshold, then pre-encoder 220 predicts that the block will likely be encoded as a skip block. For the first implementation, if the aggregated metric is in between the first threshold and a second threshold, then pre-encoder 220 predicts that the block will likely be encoded as a P-block. Otherwise, if the aggregated metric is greater than the second threshold, then pre-encoder 220 predicts that the block will likely be encoded as an I-block. It is noted that throughout this disclosure, the pixel activities can include multiple metrics even if the pixel activities are described as a single metric. This applies even if the other metrics do not strictly fall under a definition of pixel activities. For example, some metrics do not qualify as a pixel activity, but these metrics can be included in the measure of the difference between blocks. Alternatively, the pixel activities are a measure of the difference between blocks.

Based on these predictions, pre-encoder 220 determines a quantization strength range to use for encoding each block of new frame 210. In one implementation, the quantization strength range refers to a quantization parameter (QP) range. It should be understood that when the term QP is used within this document, this term is intended to apply to other types of quantization strength metrics that are used with any type of coding standard. When encoded a given block, encoder 230 selects a QP within the QP range calculated by pre-encoder 220. Using the suggested QP ranges provided by pre-encoder 220 allows encoder 230 to meet a desired bitrate for the encoded bitstream 235.

Figure 3:
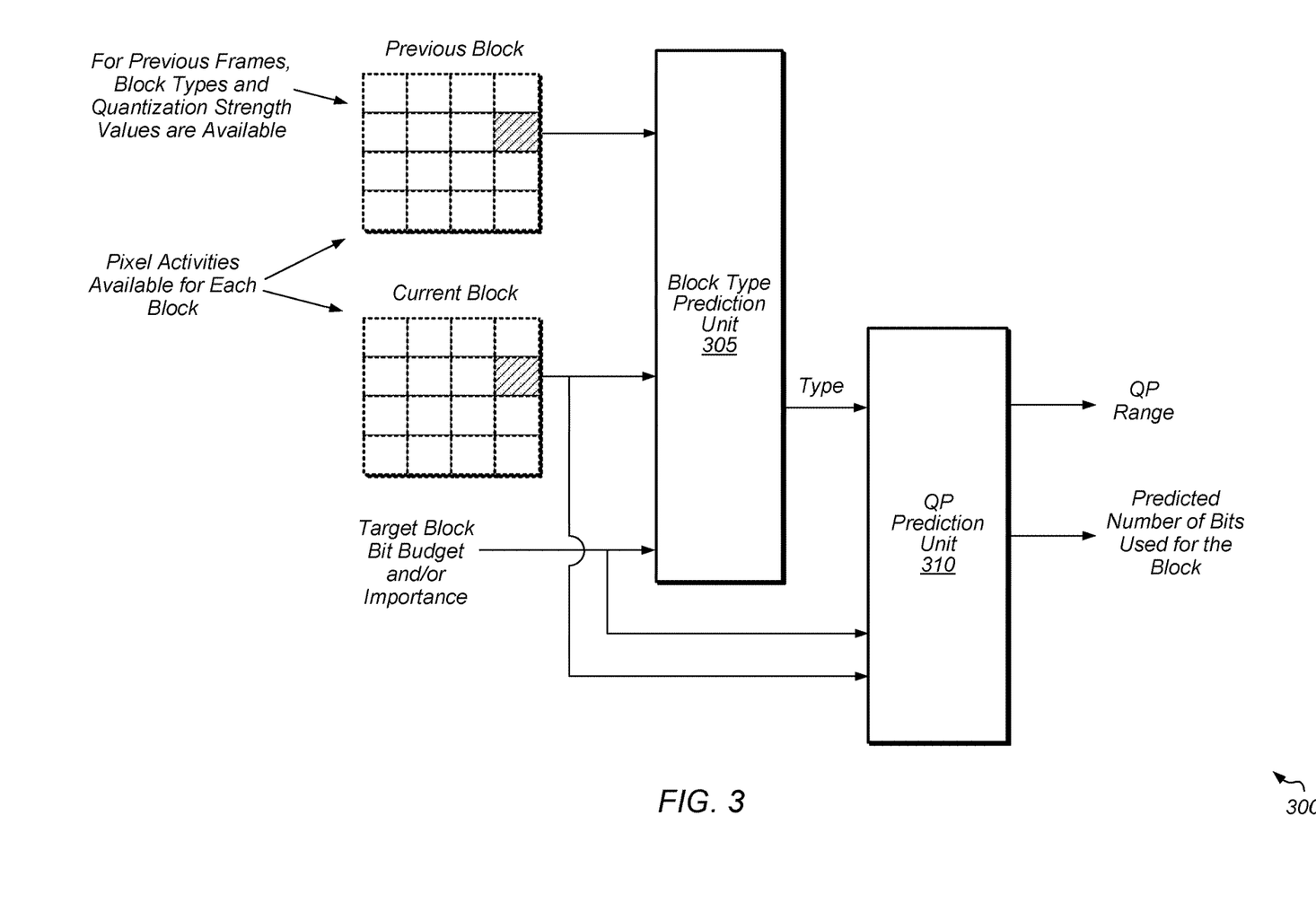
FIG. 3 is a block diagram of one implementation of a block type prediction unit and a quantization strength prediction unit.

Referring now to FIG. 3, a block diagram of one implementation of a block type prediction unit 305 and QP prediction unit 310 is shown. In one implementation, block type prediction unit 305 and QP prediction unit 310 are included within a pre-encoder (e.g., pre-encoder 220 of FIG. 2). To distribute bits effectively within an encoded version of a picture, a prediction of whether a block will likely be encoded as a type I, P, or skip block is desired, as each of these types of blocks can use a significantly different number of bits. For example, depending on the quality of the motion vector and residual data, the number of bits that the encoder will consume is lower for a P-block than for an I-block. A skip block would consume even fewer bits (almost zero). Accordingly, in one implementation, block type prediction unit 305 makes predictions for the block type that will likely be encoded for each block in each input video frame. In another implementation, block type prediction unit 305 makes predictions for only a subset of the blocks of an input video frame, with the subset including fewer than the entirety of all blocks in the frame. In one implementation, based on the block type prediction for a given block, a QP range is selected for the given block. An indication of this selected QP range is then provided to the encoder.

In one implementation, the actual block types of the encoded blocks are available for the previous frame. In one implementation, pixel activities are also available for both the previous frame and the current frame. Pixel activities can be calculated using different algorithms and for different purposes. Pixel activities can include measurements such as gradients, GLCM, wavelet and other transformations, etc. Additionally, in one implementation, a scene change detector provides an indication to block type prediction unit 305 whenever a change of scene is detected. This change of scene indication allows block type prediction unit 305 to determine how to predict how blocks will likely be encoded. For example, if a change of scene is detected for a given frame, block type prediction unit 305 can predict that all of the blocks of the given frame will likely be encoded as I-blocks. Otherwise, if a change of scene is not detected for the given frame, then block type prediction unit 305 generates block-type predictions for each block of the given frame based on one or more metrics associated with the block. In another implementation, a scene change detector is implemented based on the predictions of block types generated by block type prediction unit 305. For example, if the predicted number of I blocks, as a percentage of all blocks, reaches a certain threshold, then the current picture would be considered to be the first picture of a new scene. All blocks would then be considered as likely to be encoded as I-blocks and an appropriate algorithm could be used to determine budgeting.

In one implementation, block type prediction unit 305 predicts the likely encoded type (e.g., I, P, or skip) of each block of a current frame based on the pixel activities for the corresponding block in the previous frame compared to the pixel activities for the block in the current frame. Then, based on the type of block predicted by block type prediction unit 305 for a given block, QP prediction unit 310 generates a suggested QP range for the given block. This process is performed for each block of the current video frame. In one implementation, block type prediction unit 305 and QP prediction unit 310 are separate units. In another implementation, block type prediction unit 305 and QP prediction unit 310 are combined together into a single unit.

In one implementation, for the first frame of a video, or the first frame in a scene, all blocks are predicted to be I-type blocks. However, if the current frame is not a scene-change and the frame is P frame, then block type prediction unit 305 generates a prediction of the block type (e.g., I, P, or skip-block) based at least in part on the difference between block pixel activities between two blocks in the same location in two consecutive frames (or a location indicated by motion estimation data). Then, QP prediction unit 310 generates a QP value or a QP range and a predicted number of bits that will be used by the block based on the prediction of the block type. The QP value or range and the predicted number of bits are provided to the encoder for use in encoding the block of the current video frame. If the predicted number of bits used for the block is significantly different than the target block bit budget for a given block, this can indicate that rebudgeting might be needed. For example, if the target block bit budget is 50 and the predicted number of bits used output is close to zero, the predicted block type is likely a skip type, and this budget can be reassigned to other blocks.

It should also be noted that for a specific block bit budget, the thresholds used for comparison purposes can be static values or dynamic values that depend on history or local pixel content. For example, an algorithm that budgets bit usage based on estimated human perceptual quality could adjust these thresholds for each block position in time and space. In one implementation, the dynamic thresholds are part of a closed-loop control system, where the threshold values are changed with the goal of achieving a desired budget based on current and past performance. The dynamic threshold could also be controlled by various regressive models or machine learning or inference schemes, which could have access to previous encoder decisions, metrics, activities, and the video pixel data itself.

Figure 4:
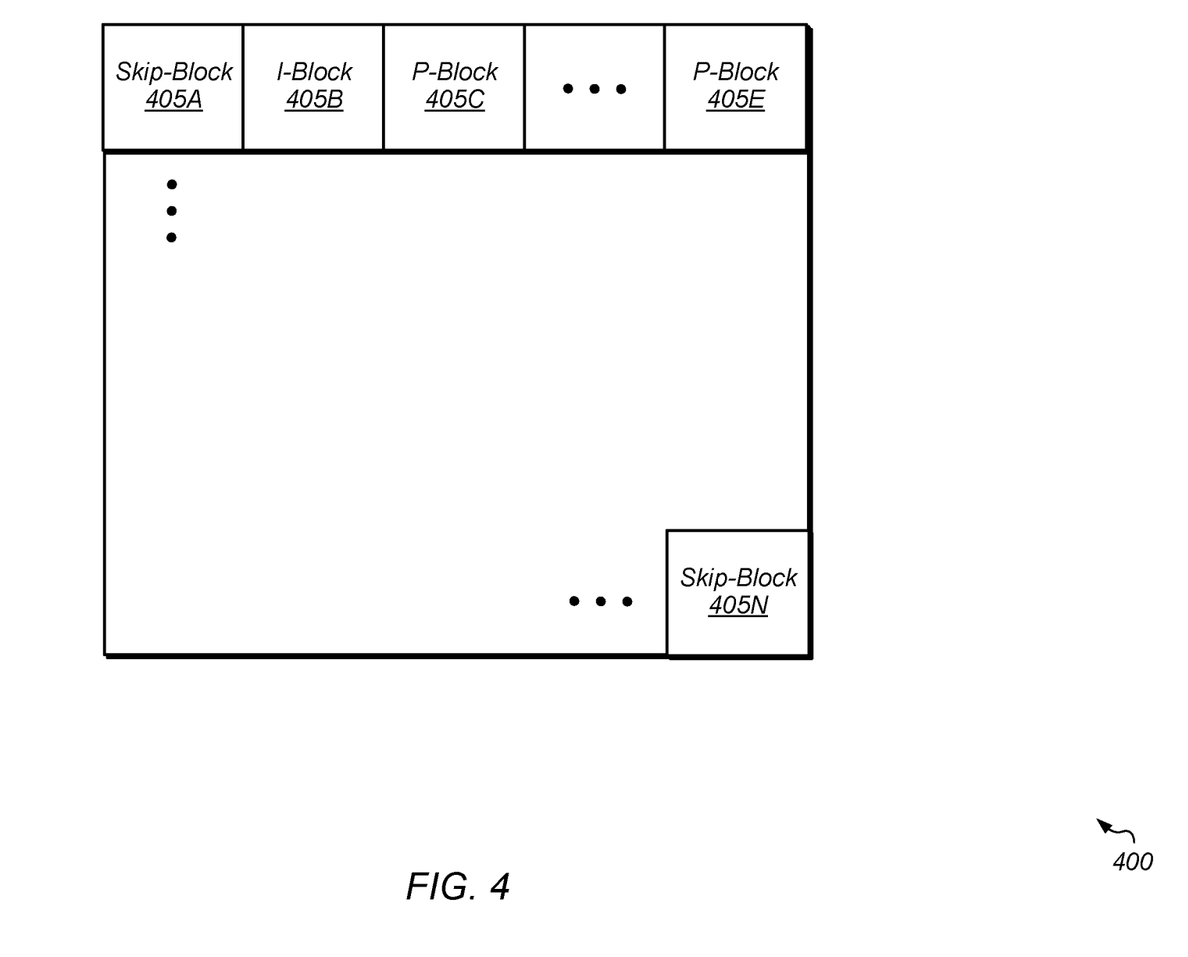
FIG. 4 illustrates one implementation of block type predictions for a video frame.

Turning now to FIG. 4, one implementation of block type predictions for a video frame 400 is shown. In one implementation, a pre-encoder (e.g., pre-encoder 220 of FIG. 2) generates block type predictions for the blocks of a given video frame 400. The block type predictions generated by the pre-encoder are used to generate QP ranges for the blocks of the given video frame 400. These QP ranges are then provided to an encoder (e.g., encoder 230 of FIG. 2) for assigning QP values to use when encoding the blocks of the video frame.

As shown, the pre-encoder has generated a skip block prediction for block 405A, an I-block prediction for block 405B, a P-block prediction for block 405C, a P-block prediction for block 405E, and a skip-block prediction for block 405N. It should be understood that these examples are merely indicative of one implementation. It is also noted that video frame 400 includes any number of blocks, with the number varying according to the implementation. Also, in other implementations, the types of blocks that can be predicted by the pre-encoder can vary. For example, in other implementations, the types of blocks that can be predicted by the pre-encoder can include B-blocks while omitting skip-blocks. Other alternatives are possible and are contemplated.

Figure 5:
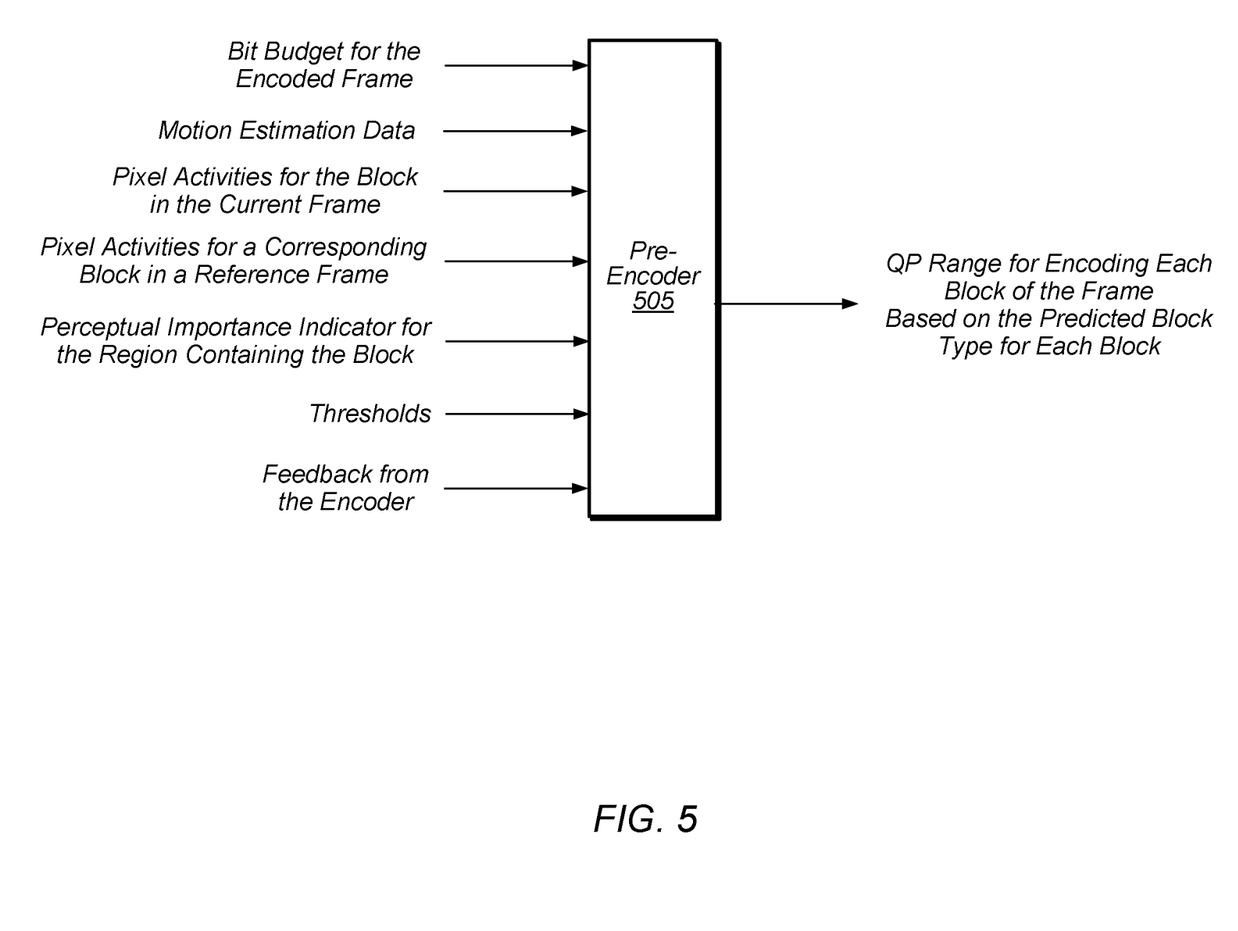
FIG. 5 is a block diagram of one implementation of a pre-encoder.

Referring now to FIG. 5, a block diagram of one implementation of a pre-encoder 505 is shown. In one implementation, pre-encoder 505 generates predictions for each block of a video frame, with the predictions specifying block types which pre-encoder 505 predicts that the encoder will use to encode the blocks of the video frame. Examples of block types include an I-block, P-block, and skip-block. In other implementations, other types of blocks can be used during the encoding process, and the pre-encoder 505 can attempt to predict when these types will occur as well. It is noted that the prediction will not always match the actual block type that the encoder uses when encoding a given block.

In one implementation, pre-encoder 505 receives feedback from the encoder which specifies the actual block types that were used during the encoding process for the blocks of a given video frame. In one implementation, the feedback is an error message which indicates which blocks were erroneously predicted and what the correct predictions should have been. Pre-encoder 505 uses the feedback to adjust its prediction mechanism to improve the prediction accuracy for the blocks of subsequent video frames. In one implementation, the thresholds used to make the predictions are adjusted based on the feedback. For example, if the majority of errors are P-block predictions that actually turn out to be encoded as I-blocks, then pre-encoder 505 increases the value of the second threshold to reduce the occurrence of prediction errors. Alternatively, if the majority of errors are I-block predictions that actually turn out to be encoded as P-blocks, then pre-encoder 505 decreases the value of the second threshold. Other adjustments to the thresholds can be made based on an analysis of the error feedback.

In one implementation, pre-encoder 505 receives the bit budget for the encoded frame, motion estimation data, the pixel activities for the block in the current frame, the pixel activities for a corresponding block in a reference frame, a perceptual importance indicator for the region containing the block, various thresholds to compare to the difference in pixel activities, and the aforementioned feedback from the encoder. In one implementation, pre-encoder 505 receives thresholds from memory, a register, a processing unit, software, or otherwise. In another implementation, pre-encoder 505 generates the thresholds at least in part based on the feedback provided by the encoder.

In one implementation, pre-encoder 505 receives motion estimation data to help make the block type predictions more accurate. Motion estimation data can include horizontal and vertical vector displacements, as well as a confidence value in the vector, and the residual (i.e., the difference between the selected reference block and the current block). In one implementation, the motion vector confidence value is a probability that an estimated motion vector is equal to the actual motion vector. In various implementations, motion estimation data is generated by fixed-function hardware, such as the motion estimator of the encoder, from a software implementation, a GPU implementation, or otherwise.

The motion estimation data can be used in a variety of ways, depending on the implementation. In one implementation, the above-described second threshold is changed based on the current vector displacements, relative to displacements of surrounding blocks. This mechanism can be used to address the increasing cost of encoding vectors that are significantly different than surrounding vectors. In another implementation, the second threshold is changed based on the confidence value of the vector or based on the residual. For example, in one implementation, the second threshold is changed based on an estimate of the bits required to encode the residual at the current quality level. Another method of using the motion estimation data is to change the pixel difference calculation when predicting I-blocks and P-blocks. In one implementation, the pixel difference calculation that is used could be the difference in the current block and the activity value of the reference block identified by the motion vector.

In one implementation, if motion estimation data is not available, pre-encoder 505 can instead use histogram data. Based on the histogram and similarities between histograms of different blocks, pre-encoder 505 can find a vector displacement and use the vector displacement to predict block types. In some embodiments, pixel activities can be used to train a model to predict the block type. The model can be a regression model, machine learning model, or otherwise. Training data includes pixel activities, differences of pixel activities, previous frame block types, and target data that includes the current frame block types. The model can be used to predict the block type. In a system that includes a motion estimator, the training data could also be motion estimation data (of the block, and of neighbors) that includes displacements, confidence, and a complexity metric calculated on the residual. In some embodiments, if the model cannot determine the block type with enough confidence, the block type predictor could use historical data, a supplemental model, or pre-set values to determine the quality and/or budget for such blocks.

In one implementation, pre-encoder 505 calculates the difference in the pixel activities for the block of the current frame and the pixel activities of a corresponding block in a reference frame. In one implementation, pre-encoder 505 uses motion estimation data (e.g., a motion vector) to identify which corresponding block in the previous frame matches a given block in a new frame. For example, in some compression standards, a motion vector associated with a block points to the source of that block in the reference frame. The reference frame can be forward or backward in time.

In one implementation, after calculating the difference in the pixel activities for the block of the current frame and the pixel activities to the corresponding block in a reference frame, pre-encoder 505 compares the difference to one or more thresholds. In one implementation, pre-encoder 505 compares the difference in pixel activities to two thresholds. For example, in this implementation, if the difference in pixel activities is less than a first threshold, then the block type is predicted to be a skip block. If the difference in pixel activities is higher than the first threshold, but lower than a second threshold, then the block type is predicted to be a P-type. If the difference in pixel activities is higher than the second threshold, then the two blocks are not similar enough, and the block type is predicted to be an I-type. In one implementation, the first and second thresholds utilized in the above-example will change based on the target bit budget for the block and/or based on another value (e.g., a quality value or perceptual importance value). The target bit budget for the block depends on the target bit budget of the frame and other factors. For example, in one implementations, pre-encoder 505 assigns more bits to specific areas of the video frame based on estimated perceptual importance. In one implementation, the budget planning and block type prediction are used by pre-encoder 505 to generate a desired QP range for blocks (all or some) of the frame.

In one implementation, pre-encoder 505 prioritizes one or more regions which have a higher perceptual importance than other regions. In this implementation, pre-encoder 505 allocates a specific percentage of the bit budget for the encoded frame to these one or more regions. Then, pre-encoder 505 calculates a QP range for the region which will utilize the specified percentage of the bit budget. In a further implementation, pre-encoder 505 adjusts the QP range on a block-by-block basis depending on the predicted block type for each block of the frame.

Figure 6:
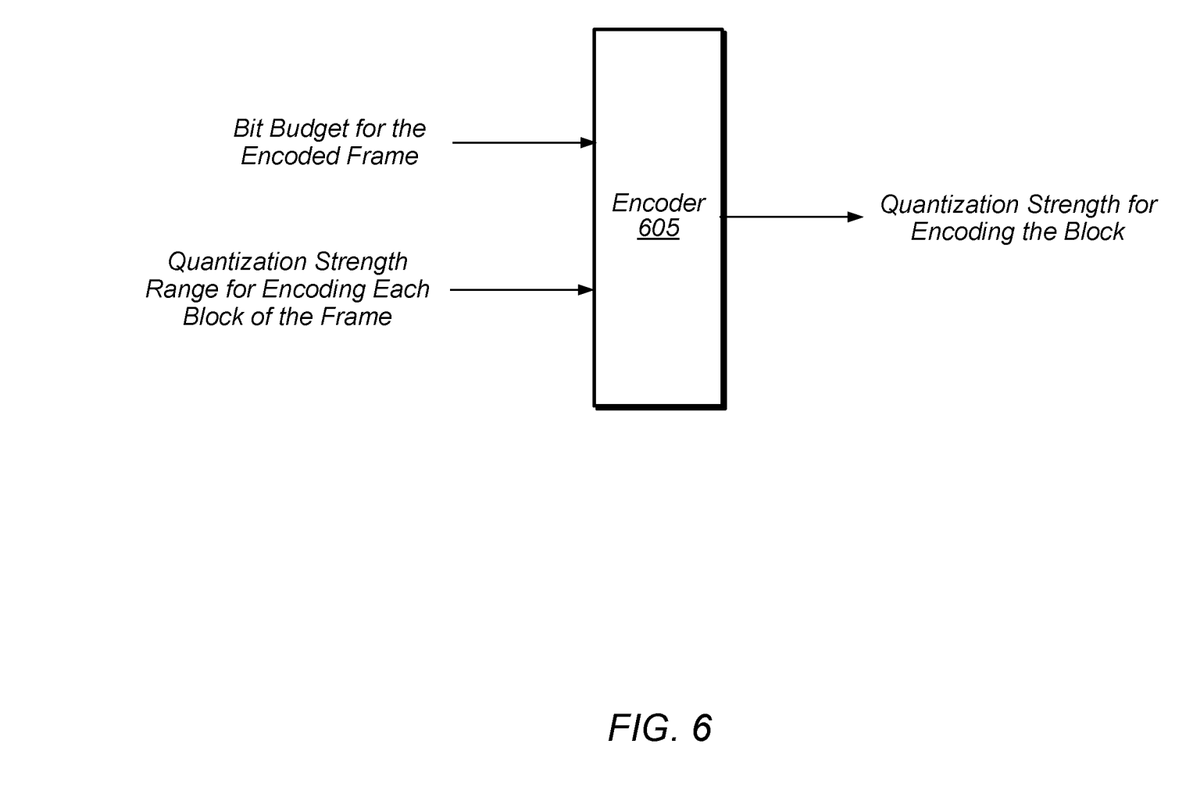
FIG. 6 is a block diagram of one implementation of an encoder.

Turning now to FIG. 6, a block diagram of one implementation of an encoder 605 is shown. In one implementation, encoder 605 receives a bit budget for an encoded frame and a QP range for each block of the frame. Encoder 605 determines a QP setting to use from the QP range when encoding each block of the frame based on the bit budget for the entire encoded frame. For example, in one implementation, a pre-encoder (e.g., pre-encoder 505 of FIG. 5) determines a count of the expected bits for the entire encoded frame based on the numbers of predicted skip blocks, P-blocks, and I-blocks. The pre-encoder determines a QP range for each block based on the predicted block type and total budget for the frame. The pre-encoder provides the QP range for each block to encoder 605. Then, encoder 605 chooses a QP setting to use for each block of the encoded frame from the provided QP range in order to meet the bit budget for the encoded frame.

Figure 7:
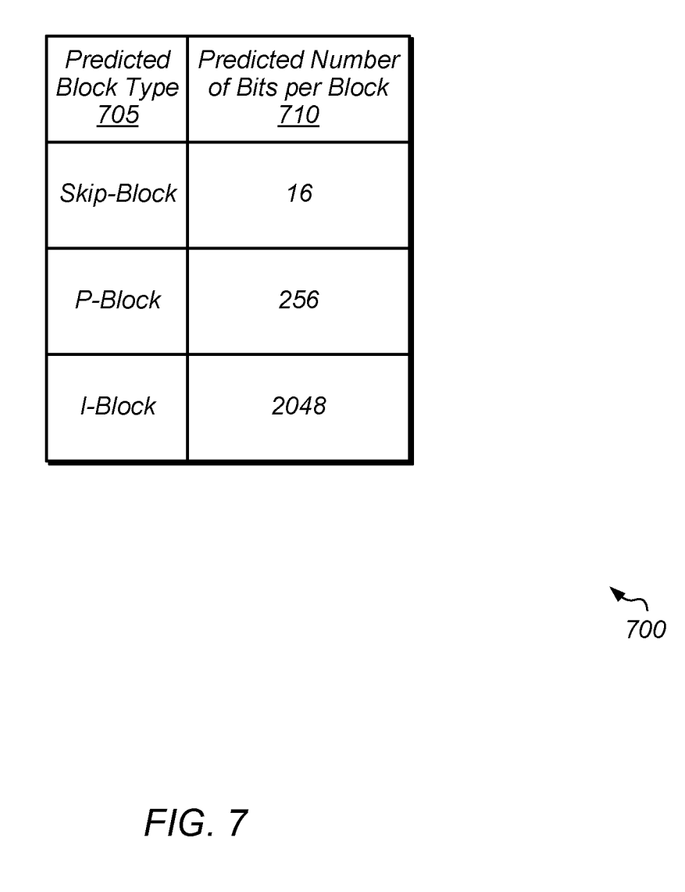
FIG. 7 illustrates one implementation of a table storing a predicted number of bits per block for each predicted block type.

Referring now to FIG. 7, one implementation of a table 700 storing a predicted number of bits per block 710 for each predicted block type 705 is shown. In one implementation, a pre-encoder generates predicted block types for the blocks of a video frame. The predicted block types are then mapped to a predicted number of bits per block type for a given QP value. Then, the pre-encoder, encoder, or another control unit determines the predicted number of bits for the entire video frame based on the predicted block types and corresponding predicted bits per block type. In various implementations, the QP used to encode the frame is adjusted on a block-by-block, region-by-region, or an entire frame basis to scale the predicted number of bits to a desired bit budget for the frame.

It is noted that in other implementations, table 700 can include other numbers of entries for other numbers of block types. For example, in another implementation, table 700 can include multiple entries for P-block types, with the pre-encoder generating predictions of different P-block types with different levels of complexity. For example, in one implementation, the types of blocks that can be predicted include a high complexity P-block, a medium complexity P-block, and a low complexity P-block. Each P-block complexity level maps to a different number of predicted bits per block. In other implementations, other types of blocks and/or different numbers of complexity levels per type are possible and are contemplated, with each block-type mapping to a corresponding predicted number of bits per block. It is noted that the values of table 700 can be adjusted based on changes made to the QP value. Alternatively, an encoder can maintain multiple tables for multiple different QP values.

Figure 8:
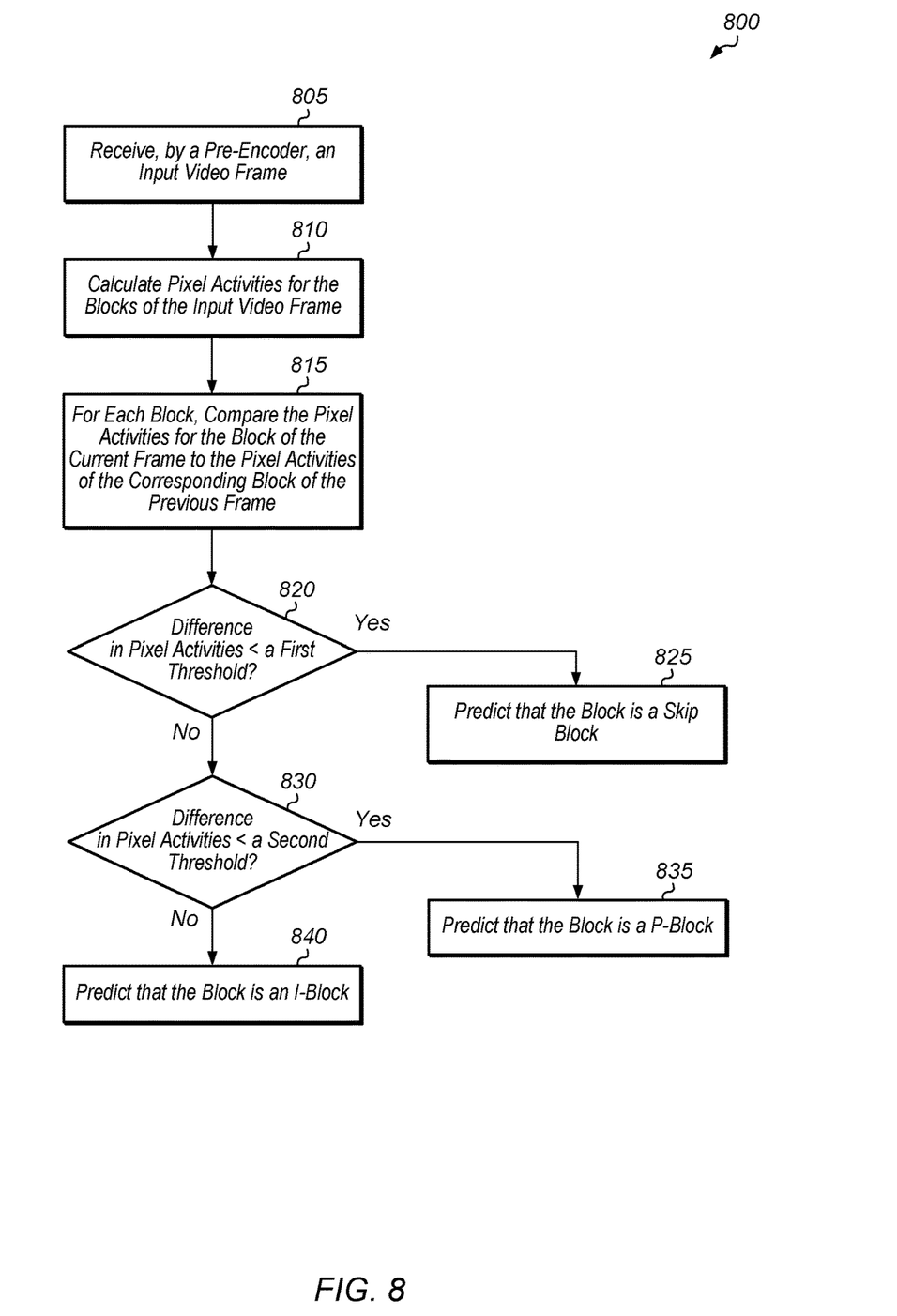
FIG. 8 is a generalized flow diagram illustrating one implementation of a method for predicting block types by a pre-encoder.
Figure 9:
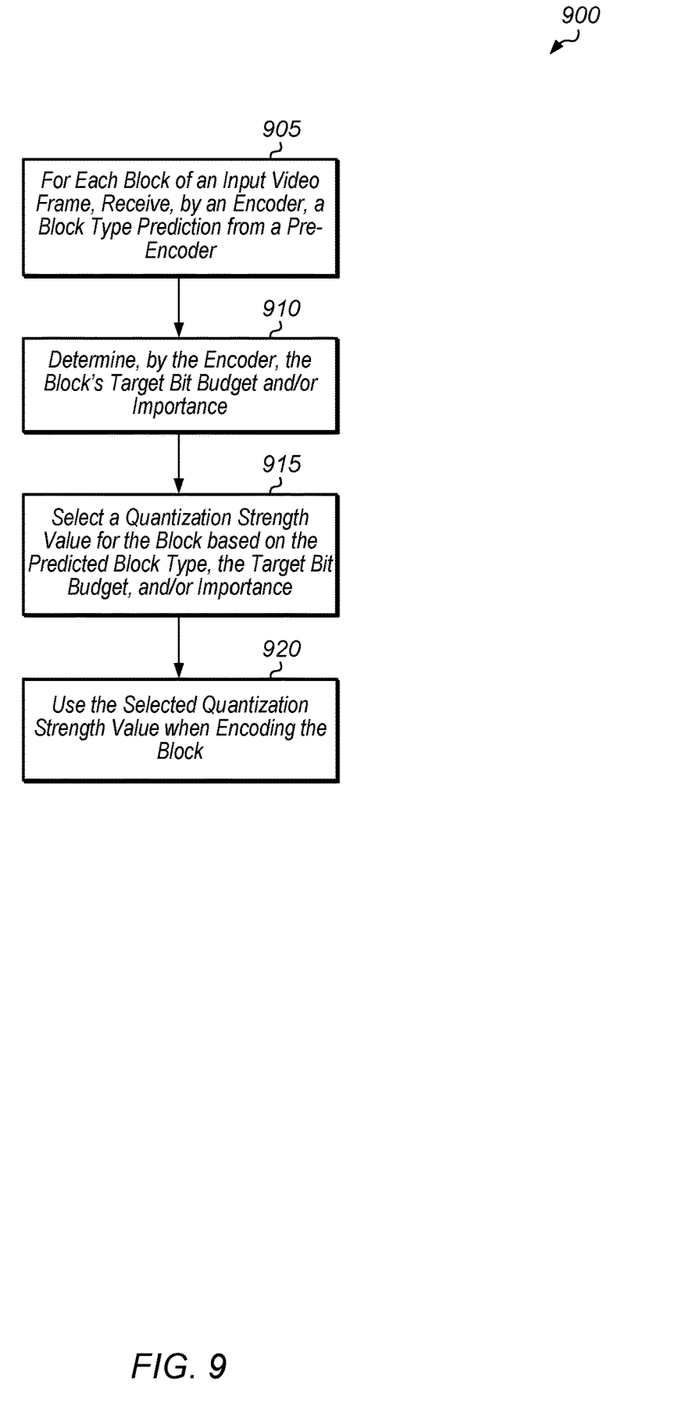
FIG. 9 is a generalized flow diagram illustrating one implementation of a method for selecting a quantization strength value for encoding each block of a video frame.
Figure 10:
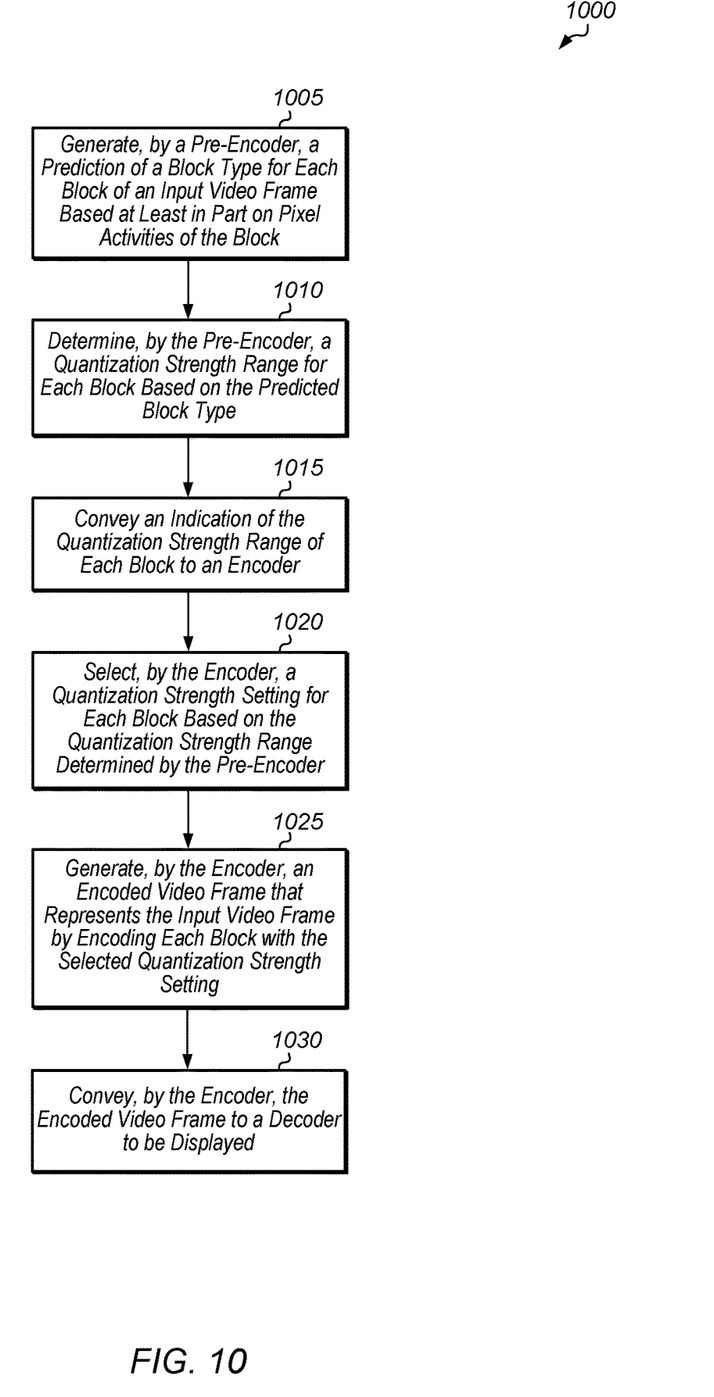
FIG. 10 is a generalized flow diagram illustrating one implementation of a method for encoding an input video frame.

Turning now to FIG. 8, one implementation of a method 800 for predicting block types by a pre-encoder is shown. For purposes of discussion, the steps in this implementation and those of FIG. 9-10 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 800.

A pre-encoder receives an input video frame (block 805). The pre-encoder calculates pixel activities for the blocks of the input video frame (block 810). It is assumed for the purposes of this discussion that the pre-encoder has access to the pixel activities for the blocks of the previous input video frame. For each block, the pre-encoder compares the pixel activities of the block of the current frame to the pixel activities of the corresponding block of the previous frame (block 815). In some cases, motion estimation data is used to identify which block of the previous frame corresponds to a given block of the current frame.

If the difference between the pixel activities of the block of the current frame and the pixel activities of the corresponding block of the previous frame is less than a first threshold (conditional block 820, "yes" leg), then the block is predicted to be a skip block (block 825). If the difference between the pixel activities of the block of the current frame and the pixel activities of the corresponding block of the previous frame is greater than or equal to the first threshold (conditional block 820, "no" leg), then the pre-encoder determines if the difference in pixel activities is less than a second threshold (conditional block 830). If the difference is less than the second threshold (conditional block 830, "yes" leg), then the block is predicted to be a P-block (block 835). If the difference is greater than or equal to the second threshold (conditional block 830, "no" leg), then the block is predicted to be an I-block (block 840). After blocks 825, 835, and 840, method 800 ends. It is noted that blocks 815-840 are performed to generate a block type prediction for each block of the input video frame.

Referring now to FIG. 9, one implementation of a method 900 for selecting a quantization strength value for encoding each block of a video frame is shown. For each block of an input video frame, an encoder receives a block type prediction from a pre-encoder (block 905). The encoder also determines the block's target bit budget and/or importance (block 910). In one implementation, the encoder calculates the block's target bit budget and/or importance. In another implementation, another unit (e.g., pre-encoder) generates the block's target bit budget and/or importance and sends this information to the encoder.

Next, the encoder selects a quantization strength value for the block based on the predicted block type, the target bit budget, and/or importance (block 915). In one implementation, the encoder uses a table to map the predicted block type, target bit budget, and/or importance to a quantization strength value. In one implementation, the quantization strength value is a quantization parameter (QP) setting. Then, the encoder uses the selected quantization strength value when encoding the block (block 920). After block 920, method 900 ends. It is noted that method 900 is performed for each block of the input video frame.

Turning now to FIG. 10, one implementation of a method 1000 for encoding an input video frame is shown. A pre-encoder generates a prediction of a block type for each block of an input video frame based at least in part on pixel activities of the block (block 1005). Next, the pre-encoder determines a quantization strength range for each block based on the predicted block type (block 1010). Then, the pre-encoder conveys an indication of the quantization strength range of each block to an encoder (block 1015).

Next, the encoder selects a quantization strength setting for each block based on the quantization strength range determined by the pre-encoder (block 1020). Then, the encoder generates an encoded video frame that represents the input video frame by encoding each block with the selected quantization strength setting (block 1025). Next, the encoder conveys the encoded video frame to a decoder to be displayed (block 1030). After block 1030, method 1000 ends. It is noted that method 1000 can be performed for each input video frame in a video sequence.

In various implementations, program instructions of a software application are used to implement the methods and/or mechanisms described herein. For example, program instructions executable by a general or special purpose processor are contemplated. In various implementations, such program instructions can be represented by a high level programming language. In other implementations, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a pre-encoder configured to:
generate a prediction of a block type that is usable for encoding a block of a plurality of blocks of an input video frame based at least in part on pixel activities of the block, wherein the block type is one of a P-block, I-Block, and skip block;
determine a quantization strength range for the block based at least in part on the predicted block type for the block; and
an encoder configured to:
select a quantization strength setting for the block based on the quantization strength range determined for the block by the pre- encoder;
generate an encoded video frame that represents the input video frame by encoding the block with the selected quantization strength setting; and
convey the encoded video frame to a decoder to be displayed.

2. The system as recited in claim 1, wherein the pre-encoder is further configured to assign a number of bits to the block based on the prediction of the block type generated by the pre-encoder.

3. The system as recited in claim 1, wherein the pre-encoder is further configured to determine the quantization strength range based on a number of bits assigned to the block by the pre-encoder, which is a specific portion of a bit budget allocated to the encoded video frame.

4. The system as recited in claim 1, wherein:
the encoder is further configured to:
receive the input video frame; and
send feedback to the pre-encoder specifying actual block types that were used during the encoding process for each of the plurality of blocks of the input video frame.

5. The system as recited in claim 1, wherein the pre-encoder is further configured to predict that the block is a skip block, responsive to determining a difference between pixel activities for the block in the input video frame and a previous video frame does not meet a first threshold.

6. The system as recited in claim 1, wherein the pre-encoder is further configured to predict that the block is a P-block, responsive to determining a difference between pixel activities for the block in the input video frame and a previous video frame meets a first threshold but does not meet a second threshold.

7. The system as recited in claim 1, wherein the pre-encoder is further configured to predict that the block is an I-block, responsive to determining a difference between pixel activities for the block in the input video frame and a previous video frame meets a threshold.

8. A method comprising:
generating, by a pre-encoder, a prediction of a block type that is usable for encoding a block of a plurality of blocks of an input video frame based at least in part on pixel activities of the block, wherein the block type is one of a P-block, I-Block, and skip block;
determining, by the pre-encoder, a quantization strength range for the block based at least in part on a predicted block type for the block;
selecting, by an encoder, a quantization strength setting for the block based on the quantization strength range determined by the pre-encoder;
generating, by the encoder, an encoded video frame that represents the input video frame by encoding each block with the selected quantization strength setting; and
conveying, by the encoder, the encoded video frame to a decoder to be displayed.

9. The method as recited in claim 8, further comprising assigning, by the pre- encoder, a number of bits to the block based on the prediction of the block type generated by the pre-encoder.

10. The method as recited in claim 8, wherein the pre-encoder is further configured to determine the quantization strength range based on a number of bits assigned to the block by the pre-encoder, which is a specific portion of a bit budget allocated to the encoded video frame.

11. The method as recited in claim 8, further comprising:
receiving, by the encoder, the input video frame; and
sending, by the encoder, feedback to the pre-encoder specifying actual block types that were used during the encoding process for each of the plurality of blocks of the input video frame.

12. The method as recited in claim 8, further comprising predicting, by the pre-encoder, that the block is a skip block, responsive to determining a difference between pixel activities for the given block in the input video frame and a previous video frame does not meet a first threshold.

13. The method as recited in claim 8, further comprising predicting, by the pre-encoder, that the block is a P-block, responsive to determining a difference between pixel activities for the block in the input video frame and a previous video frame meets a first threshold but does not meet a second threshold.

14. The method as recited in claim 8, further comprising predicting, by the pre-encoder, that the block is an I-block, responsive to determining a difference between pixel activities for the block in the input video frame and a previous video frame meets a second threshold.

15. An apparatus comprising:
a memory; and
a pre-encoder coupled to the memory, wherein the pre-encoder is configured to:
generate a prediction of a block type that may be used is usable for encoding a block of a plurality of blocks of an input video frame based at least in part on pixel activities of the block, wherein the block type is one of a P-block, I-Block, and skip block;
determine a quantization strength range for the block based at least in part on a predicted block type; and
convey the quantization strength range to an encoder for use in determining a quantization strength setting when encoding the block of the input video frame.

16. The apparatus as recited in claim 15, wherein the pre-encoder is further configured to assign a number of bits to the block based on the prediction of the block type generated by the pre-encoder.

17. The apparatus as recited in claim 15, wherein the pre-encoder is further configured to determine the quantization strength range based on a number of bits assigned to the block by the pre-encoder, which is a specific portion of a bit budget allocated to the encoded video frame.

18. The apparatus as recited in claim 15, wherein:
the pre-encoder is further configured to:
receive feedback from the encoder specifying actual block types that were used during the encoding process for each of the plurality of blocks of the input video frame.

19. The apparatus as recited in claim 15, wherein the pre-encoder is further configured to predict that the block is a skip block, responsive to determining a difference between pixel activities for the block in the input video frame and the previous video frame does not meet a first threshold.

20. The apparatus as recited in claim 15, wherein the pre-encoder is further configured to predict that the block is a P-block, responsive to determining a difference between pixel activities for the block in the input video frame and the previous video frame meets a first threshold but does not meet a second threshold.

21. The apparatus as recited in claim 15, wherein the pre-encoder is configured to receive an indication as to whether the prediction was correct.

\* \* \* \* \*

UNITED STATES PATENT AND TRADEMARK OFFICE
CERTIFICATE OF CORRECTION

| | |
|---|---|
| PATENT NO. | : 11,234,004 B2 |
| APPLICATION NO. | : 16/207893 |
| DATED | : January 25, 2022 |
| INVENTOR(S) | : Saeedi et al. |

It is certified that error appears in the above-identified patent and that said Letters Patent is hereby corrected as shown below:

In the Claims

Column 14, Claim 15, Line 51, please delete "may be used".

Signed and Sealed this
Seventeenth Day of May, 2022

Katherine Kelly Vidal
*Director of the United States Patent and Trademark Office*